United States Patent [19]
De Ruyter et al.

[11] Patent Number: 5,534,278
[45] Date of Patent: Jul. 9, 1996

[54] PROCESS AND APPARATUS FOR MAKING MEAT ANALOGS

[76] Inventors: Peter W. De Ruyter, 6865 Chemin Norwalk, Suite 806, Cote St. Luc, Quebec, Canada, H4W 2X7; Noel Almey, 1576 Avenue Ducharme, Montreal, Quebec, Canada, H2V 1G3; Josef Slanik, 40 Caribou Crescent, Kirkland, Quebec, Canada, H9J 2H8; Wesley W. Teich, 111 Pettey La., Westport, Mass. 02790-1408

[21] Appl. No.: 178,203

[22] Filed: Jan. 6, 1994

[51] Int. Cl.⁶ ............................. H05B 3/00; H05B 6/00; A23J 3/00
[52] U.S. Cl. .................. 426/237; 99/451; 99/DIG. 14; 426/241; 426/244
[58] Field of Search ................................. 426/237, 241, 426/244, 245, 516; 99/451, DIG. 14; 392/314, 480

[56] References Cited

U.S. PATENT DOCUMENTS 4,434,357  2/1984  Simpson et al. .................... 426/244
4,910,040  3/1990  Sagarino et al. ................... 426/516

Primary Examiner—George Yeung
Attorney, Agent, or Firm—Eric Fincham

[57] ABSTRACT

There is provided a method and apparatus for forming meat analog products and for texturizing a doughmass wherein the ingredients are mixed, passed through a conduit having a decreasing cross-sectional area while the doughmass is heated therein, the heating being done such that a greater heat intensity is applied to the center of the doughmass than to the doughmass adjacent the walls of the conduit.

19 Claims, 9 Drawing Sheets

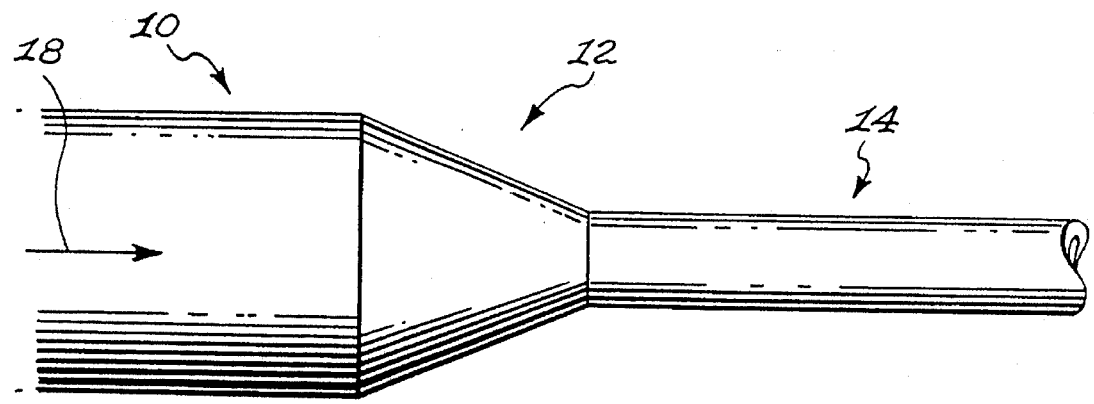
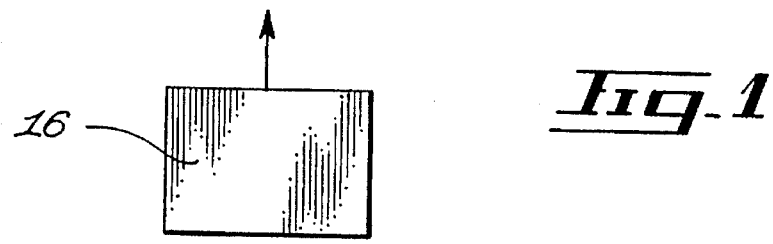
Fig. 1
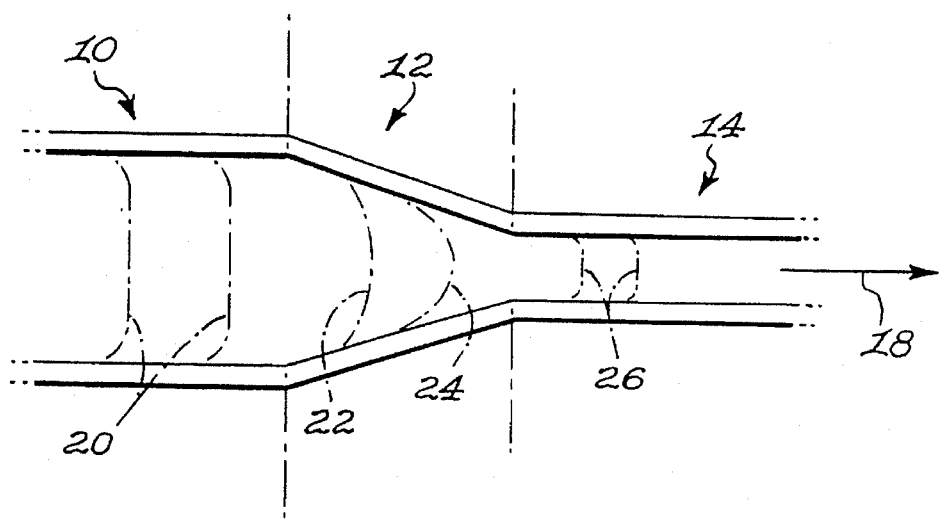
Fig. 2

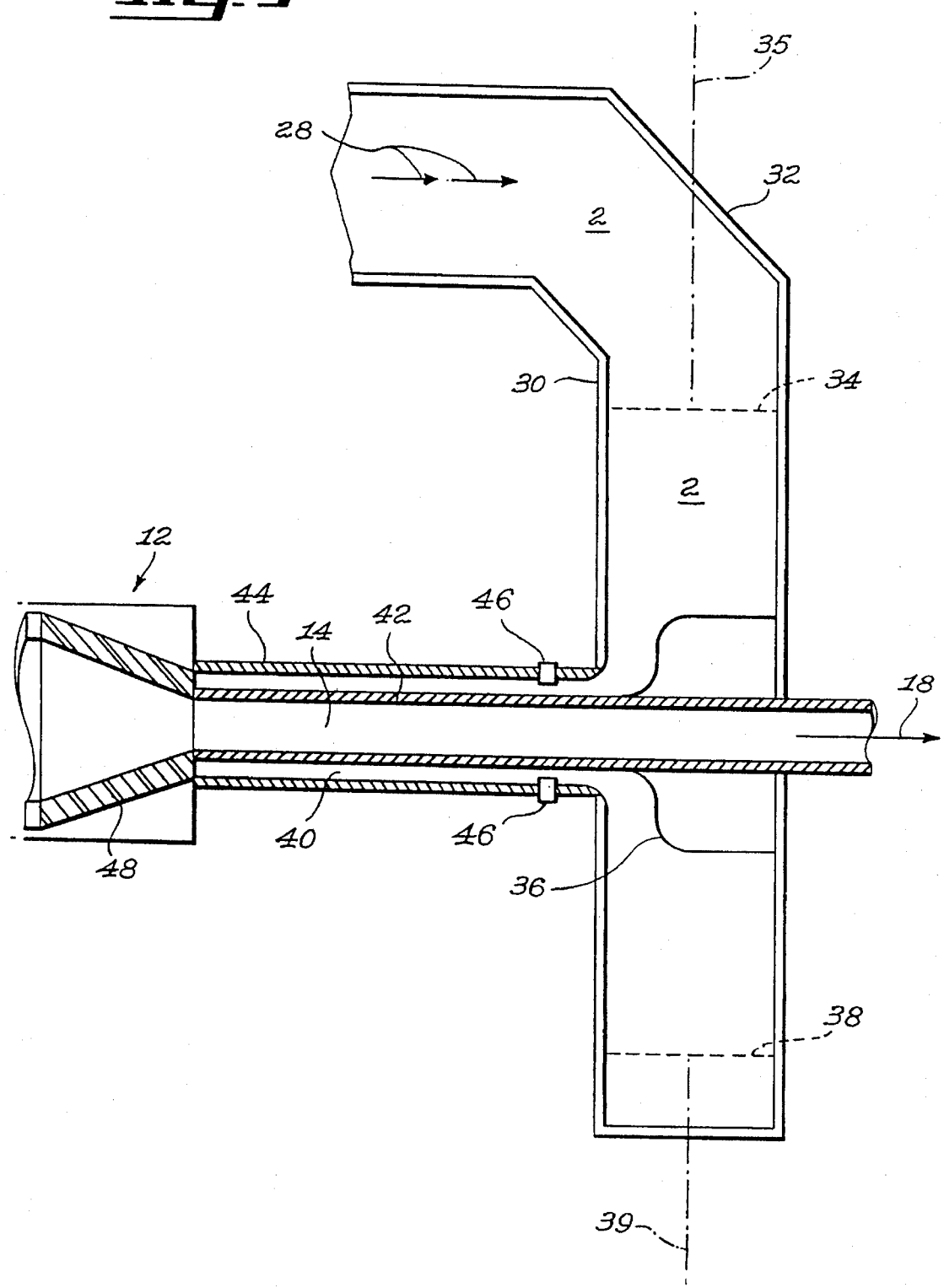

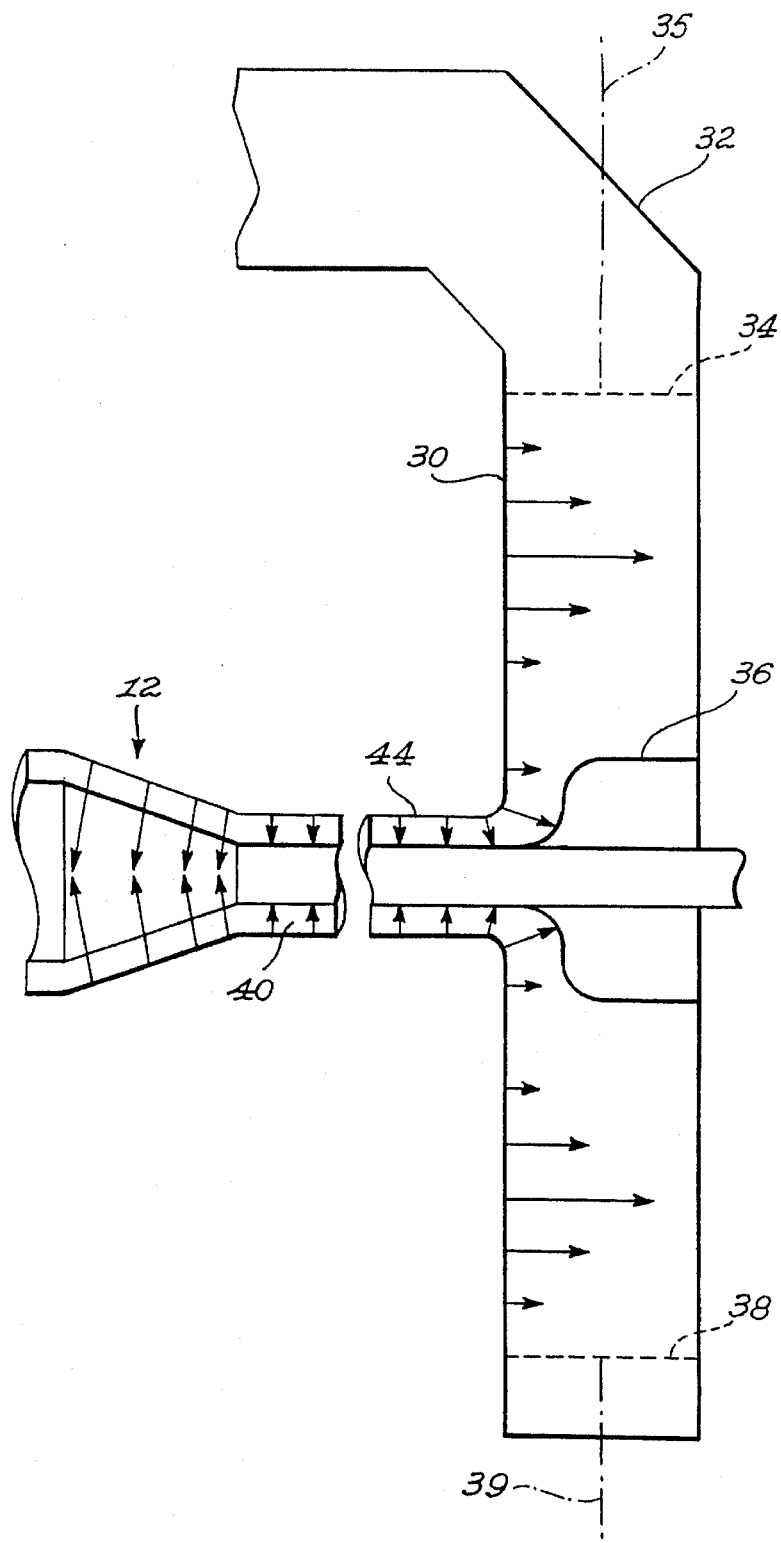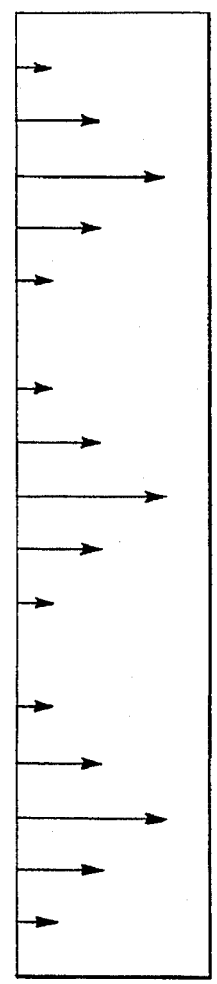

PROCESS AND APPARATUS FOR MAKING MEAT ANALOGS

BACKGROUND OF THE INVENTION

The present invention relates to meat analogs and more particularly, relates to a method and apparatus for forming meat analog products.

Meat analog products are well known in the art and there have been various methods and apparati proposed for preparing such products. The meat analog products are frequently used as substitutes for natural meat products as they consist of all-vegetable materials, may contain fewer fat calories and have a lower cholesterol content. However, in order to obtain consumer acceptance, the visual appearance and the texture of the products must meet certain standards. To date, this has been difficult to do leading to the situation that, although one can manufacture products which have certain superior properties such as nutritional value, the various sensory properties desired have not been achieved for a product which can be manufactured on a commercial scale.

Originally, the formation of meat analog products relied on the use of fiber spinning wherein a spinning dope is formed from alkali treated protein with the dope subsequently being extruded through a die or membrane into an aqueous precipitant bath which sets the filaments or fibers. Also known in the art are thermoplastic extrusion techniques to form certain products where a mixture of protein, water and flavor ingredients is fed into a cooker extruder and subsequently released into the atmosphere.

Various attempts have been made in the past years to arrive at a more consumer acceptable product and techniques have included the forming of a dough which is then subjected to stretching and heat to provide uni-directional parallel meat like fibers. Although such processes have been described since the 1960's, applicant is not aware of products being produced on a commercial scale utilizing this technology. Such technology has been described, for example, in U.S. Pat. Nos. 3,693,533; 3,814,823; 4,125,635; and 4,910,040. In the last mentioned patent, the patentee discloses a method for preparing food products having aligned fibers wherein a protein source and a carbohydrate source are mixed, forced through a first passageway having a constant cross-sectional area, pushed through a second passageway having a decreasing cross-sectional area, and then pushed through a third passageway with a constant cross-sectional area, and heating the fibers in the third section to fix or set the fibers in a linearly aligned configuration.

While there are different theories as to how and why the fibers form, it has been well established that there does indeed exist fiber formation as a result of mixing the required ingredients along with the application of heat and stretching. However, the methods and apparatuses for the production of such meat analog products have generally tended to exist only in laboratory type apparatuses and to date, to the best of applicant's knowledge, there does not exist a system capable of sufficient throughput to become commercially viable. It is believed that this lack of commercial success is due to the inability to scale up from laboratory type of systems to systems which are capable of producing commercial quantities.

SUMMARY OF THE INVENTION

It is therefore an object of the present invention to provide a method and apparatus for the production of meat analog products, which method and apparatus can operate on a commercial scale.

It is a further object of the present invention to provide a method and apparatus for the production of meat analog products wherein novel means of heating the dough are provided to overcome the limitations inherent in methods taught in the prior art and to thereby make it possible to increase throughput, without compromising product quality, in a manner sufficient for the process to become commercially viable.

It is a further object of the present invention to provide a method and apparatus for the formation of meat analog products wherein microwave heating is utilized.

It is a still further object of the present invention to provide a method and apparatus suitable for the preparation of meat analog products wherein ohmic heating is utilized to heat the doughmass.

It is a further object of the present invention to provide methods and apparati for the manufacture of meat analog products wherein greater uniformity of fiber formation in the product is provided.

According to one aspect of the present invention, there is provided an apparatus suitable for the manufacture of meat analog products, the apparatus comprising means for mixing the ingredients, means for passing the ingredients through a conduit having a decreasing cross-sectional area in the direction of product flow, a substantially constant cross-sectional area exit tube, and means for heating the doughmass inside conduit with the decreasing cross-sectional area, the heating means comprising microwaves transported to the doughmass through a coaxial waveguide extending along the exit tube.

There is also provided a method of producing a food product having fibers formed therein, the method including the steps of forming a doughmass, passing the doughmass through a conduit having a decreasing cross-sectional area in the direction of doughmass flow, subjecting the doughmass to a thermal treatment while in the conduit such that a greater heat intensity is supplied to the interior portion of the dough compared to the doughmass adjacent the conduit walls, and thereafter passing the doughmass through an exit pipe having a substantially constant cross-sectional area.

There is also provided a method of producing a food product having fibers formed therein, comprising the steps of forming a doughmass, passing the doughmass through a conduit having a decreasing cross-sectional area in the direction of doughmass flow, subjecting the doughmass to microwave energy having a standing wave pattern such that more power is applied to the central part of the doughmass inside the conduit with the decreasing cross-sectional area compared to the doughmass adjacent the conduit walls, and thereafter passing the heated doughmass through an exit conduit having a substantially constant cross-sectional area.

In another aspect, there is provided an apparatus suitable for producing a food product having fibers formed therein, the apparatus comprising means for mixing ingredients to form a doughmass, means for passing the doughmass through a conduit having a decreasing cross-sectional area in the direction of product flow, a substantially constant cross-sectional area exit tube connected to a smaller end of the conduit, thermal treatment means adapted to subject the doughmass in the conduit to a thermal treatment such that the doughmass in the interior portion of the conduit is subjected to a greater heat intensity than the doughmass adjacent the conduit walls.

There is also provided an apparatus for producing a food product having fibers formed therein, the apparatus comprising means for mixing ingredients to form a doughmass, means for passing the doughmass through a conduit having a decreasing cross-sectional area in the direction of product flow, a substantially constant cross-sectional area exit tube connected to the smaller end of the conduit, microwave heating means adapted to subject the doughmass to microwave energy having a standing wave pattern such that more power is applied to the central part of the doughmass compared to the doughmass adjacent the conduit walls.

There is also provided a method of producing a food product having fibers formed therein, the method including the steps of forming a doughmass, passing the doughmass through a conduit having a decreasing cross-sectional area in the direction of doughmass flow, subsequently passing the doughmass through an exit pipe having a substantially constant cross-sectional area, and heating the doughmass while in the decreasing cross-sectional area conduit by guiding microwaves through a coaxial waveguide formed between an exterior of the exit pipe and housing thereabouts such that microwave energy passes through a wall of the conduit in order to heat the doughmass product therein.

There is also a method of producing a food product having fibers formed therein, the method comprising the steps of forming a doughmass, passing the doughmass through a conduit having a decreasing cross-sectional area in the direction of doughmass flow, thereafter passing the heated doughmass through an exit pipe having a substantially constant cross-sectional area, and heating the doughmass while in the conduit by passing current through the doughmass to thereby heat the doughmass, generally referred to herein as ohmic heating.

There is also provided an apparatus suitable for producing a food product having fibers formed therein, the apparatus including a feed pipe, a conduit having a decreasing cross-sectional area extending from the feed pipe, an exit pipe connected to the narrower end of the conduit having the decreasing cross-sectional area, a first electrode located in the conduit, a second electrode associated with the feed pipe or conduit, and means for connecting the electrodes to a source of energy such that current will pass between the electrodes when a doughmass is in the conduit.

The dough used in the present invention can be formed of known ingredients as has been amply discussed in the art. Thus, the dough may include a variety of different protein containing ingredients, which, in a preferred embodiment may include a mixture of wheat gluten and a soya protein isolate. The dough may also contain a number of different additives or dough conditioners along with blends of cereal, oil seed and vegetable proteins, and optionally including fish proteins, dairy proteins as well as emulsions of meat and/or poultry. Carbohydrates in the dough may be specifically added or alternatively, carbohydrates may be present in the particular protein containing ingredient which is utilized.

Even further, other materials may be added to or comprise the doughmass. Thus, materials such as lentils, chick-peas, algae and insect proteins could be utilized. It would also be possible to incorporate certain animal derived materials within the doughmass to provide a desired engineered product.

As will be appreciated by those knowledgeable in the art, various ratios of protein to carbohydrate to water may be utilized depending upon the final product desired. In preferred embodiments, the protein preferably comprises between 30% and 80% of the doughmass on a dry basis and more preferably, between 40% and 70%. The water content preferably is between 20% and 70% of the moist doughmass and more preferably, between 30% and 60%.

Conventional additives including lubricating agents, flavoring materials, salt, sweetening agents, and the like can also be added to the dough. The use of these additives is conventional and the process of the present invention is not limited thereto; it is understood that one skilled in the art is able to arrive at formulations in which fibers will be formed. It is also understood that certain formulations may either enhance or diminish the degree of fiber formation and again, it is well within the skill of one knowledgeable in the art to vary the formulation depending upon the final product desired. It will be understood that the use of the term "meat analog products" herein includes all those products which are of a fibrous nature and formed from a dough.

The general design of an apparatus for forming meat analog products is well known in the art and thus, a typical system includes means for mixing, wetting and kneading the various ingredients for a period of time sufficient to provide a dough like material. The means of mixing and kneading the dough are well known in the art and the mixing may either be done on a batch or a continuous basis.

The dough is then passed through a conduit or passageway which has a decreasing cross-sectional area in the direction of the doughmass flow. In order to feed the conduit or passageway having the decreasing cross-sectional area, there may conveniently be provided a feed pipe as is well known in the art. As the dough is passed through the conduit, it is subjected to a heating step to heat the dough sufficiently to form and substantially set the fibers. In most embodiments of the present invention, it is preferred that the dough be subjected to a thermal treatment such that the doughmass at the center of the conduit is subjected to a greater heating intensity than the doughmass adjacent the conduit walls. In other words, it is preferred that the center of the doughmass be heated at a greater rate (more energy) since the velocity profile of the doughmass is such that the dough at the center of the conduit moves at a greater speed than the dough which is closer to the walls of the conduit. This increasingly parabolically shaped velocity profile of the doughmass through the conduit with the decreasing cross-sectional area means that if uniform heating is attempted, the doughmass adjacent the walls will be heated to a greater extent than that in the interior. Accordingly, according to the present invention steps are taken to ensure that a greater heat intensity is applied to the interior of the doughmass compared to that adjacent the conduit walls.

The means of effecting the greater heating at the center of the doughmass may include several different arrangements. Thus, for example, one may elect to cool the outer layers of the doughmass to attempt to equalize the temperature distribution. Alternatively, one may use certain configurations of microwave heating such that there is greater microwave energy intensity at the center. Still further, one may employ ohmic heating for such purposes as will be discussed in greater detail hereinbelow.

As mentioned above, the present invention contemplates the use of microwave heating as one of the means of heating the doughmass inside the conduit having the decreasing cross-sectional area.

As will be described in greater detail, different applicators may be used for the microwave heating. In the description herein, the conduit having a decreasing cross-sectional area will generally be referred to as having a conical configuration (it may also be referred to as conical section or cone) since a truncated cone is one of the easier configurations to work with. It will be understood that different configurations can also be used, i.e. a rectangular tapered section or other geometric configurations. Thus, in one embodiment, one may use, as a means of microwave heating the doughmass inside the conical section, a rigid coaxial microwave applicator with single cone-end feed. Such design permits the microwave energy to be transported from an exterior power source to inside the conical section and thus permits heating the doughmass inside the conical section while at the same time permitting construction with a steel enclosure thereby making the device resistant to the very high pressures resulting from moving the doughmass through it at large flow rates. Alternative applicators with contoured heating can also be used as will be described in greater detail hereinbelow.

While at the present time both the 2450 MHz and the 915 MHz microwave frequency (895 MHz in the United Kingdom) can be used, where allowed by the regulations governing radio communications and other communications in various countries, it has generally been preferred to use 915 MHz microwave energy in view of its greater heat penetrating ability allowing to uniformly heat samples with a greater diameter. This can be important in the design of applicators for a device that needs to permit commercial scale output flowrates. Naturally, other frequencies could be used.

The conical section is preferably constructed with an inner layer of FDA approved non-metallic material that is microwave transparent, i.e. material that has a low dielectric loss factor. The microwaves flow through the non-metallic material which then stays relatively cool. An outer steel shell encasing the inner layer of non-metallic material provides the necessary strength and prevents the escape of the microwave radiation.

As is understood by those knowledgeable in the art, the optimum transmission and absorption of microwave power is dependant on the shape and dimensions of the components. A smooth surface finish is essential in the microwave carrying parts and rounded corners help to prevent arc-over. The air space in the coaxial waveguide must be neither too small nor too large—i.e. if the space is too small, there is a danger of arc-over and if it is too large, there is the possibility of the formation of a TE 11 mode which would likely introduce uneven power distribution around the cone circumference. The dimensions of the various parts are interdependent; for optimum power transfer and symmetry, the coaxial waveguide dimensions and the transition cylinder shape must be adjusted to each other and the cone size. Again, this is within the capability of those knowledgeable in the art.

Prior to the conduit of decreasing cross-sectional area, there may be provided a preheat section wherein the doughmass is subjected to a preheating step as is well known in the art. Typically, the preheat section raises the dough to a temperature in the range of between 60° to 80° C. while in the conical section, the doughmass is raised to a heat of between 90° and 140° C.

In another embodiment of the present invention, ohmic heating may be utilized to heat the doughmass. In the ohmic heating, a current is passed through the doughmass and several different arrangements may be utilized. Thus, one can arrange configurations to provide a greater concentration at the center of the product and thus, at high flow rates, when the material in the cone moves more slowly at the outer edges than at the center, the contoured heat input having lower heating power input at the outer edge would reduce or prevent overheating and hardening of the product at the outer edges. Thus, one can produce different heat inputs at the center and outer edge.

Having thus generally described the invention, reference will be made to the accompanying drawings illustrating embodiments thereof, in which:

BRIEF DESCRIPTION OF THE DRAWINGS

FIG. 1 is a schematic block diagram of an apparatus for forming texturized proteins;

FIG. 2 is a schematic view illustrating flow of doughmass through the apparatus;

FIG. 3 is a schematic of a top sectional view of an apparatus utilizing microwave heating;

FIG. 4 is a view similar to FIG. 3 illustrating schematically the waves of the microwave heating;

FIG. 5 shows the electric field in the waveguide;

DETAILED DESCRIPTION OF THE INVENTION

Figure 6:
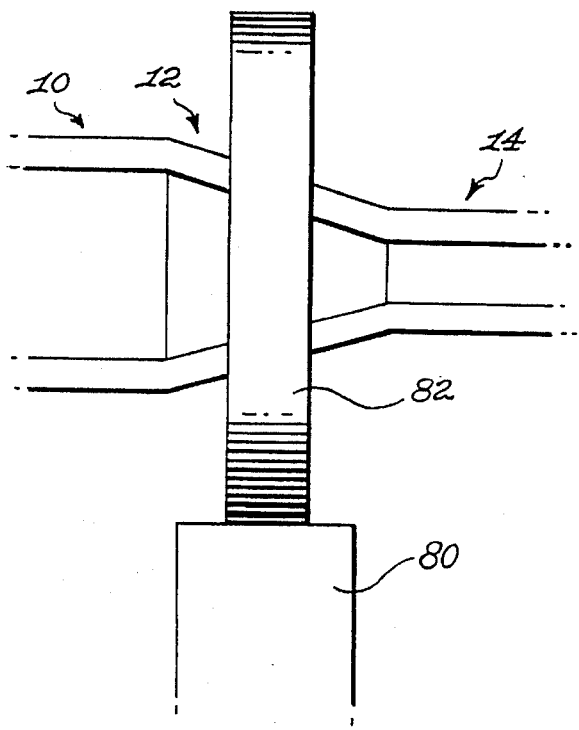
FIG. 6 is a top view of a microwave cone heat section with a single mode cavity and single iris feed.

Referring to the drawings in greater detail, and by reference characters thereto, in FIG. 1 there is a block diagram of a typical apparatus for forming meat analog products and this apparatus would include a first section which functions as a feed section 10; a section 12 having a conduit of a decreasing cross-sectional area in the direction of product flow as indicated by arrow 18; and an exit pipe section 14. Box 16 indicates typical system controls which would be utilized.

Turning to FIG. 2, there is illustrated therein the flow of the product within the apparatus. In feed section 10, as indicated by lines 20, there exists what could be termed "plug flow" wherein the majority of the product advances at an even velocity with a slight slowing adjacent the walls of the conduit. Once the product enters conical section 12, as indicated by line 22, the rate of flow at the center tends to increase visa vis the flow closer to the walls of the conduit. As the cross-sectional area continues to decrease, the velocity profile becomes increasingly parabolic as shown by line 24. Subsequently, in exit zone 14, as shown by profile lines 26, the product flow reverts to a plug type flow.

One embodiment of an apparatus using microwave energy for heating of the dough is shown in FIG. 3 wherein microwave energy (arrows 28), generated from a suitable microwave power source, is propagated in a conventional rectangular waveguide 30 in the usual transverse electric $TE_{10}$ mode with the electric field parallel to the short walls of the waveguide 30.

The electromagnetic field follows the 45 degree bend generally designated by reference numeral 32 and then strikes adjustable rectangular aperture 34 with most of the energy passing through the aperture 34. A shaft 35 made of dielectric material is connected to a suitable drive. Some of the microwaves impinge on a transition cylinder 36 while others go around transition cylinder 36 and are reflected back by a sliding short 38. Sliding short 38 has a drive shaft 39 associated therewith. The interaction of the microwaves, flowing in opposite directions, sets up a standing wave within the waveguide section between aperture 34 and sliding short 38. Adjustment of sliding aperture 34 and sliding short 38 by suitable motors (not shown) will position a wave peak at the center of transition cylinder 36.

Transition cylinder 36 is formed of a metallic material and is shaped to guide the microwaves into a space between the outer surface of exit pipe 42 and the inner surface of a metallic outer tube 44. This thus forms a coaxial space 40 which becomes the coaxial waveguide. Thus, the field propagates along coaxial waveguide 40 in the usual transverse electromagnetic TEM mode. There may be some asymmetry of power levels on opposite sides of the transition cylinder 36 and on opposite sides of the coaxial waveguide 40 especially near the transition. A certain length of coaxial waveguide of at least 3 feet (or about 3 wavelengths at 915 MHz) permits considerable dissipation and equalization of the asymmetric field and currents. In addition, there are provided a pair of probes 46 mounted through outer tube 44 to monitor the balance of the microwave field intensity on both sides of the transition cylinder 36. This data, and forward and reflected power measurements, are the inputs to a feedback control (not shown) which can then adjust the positions of sliding aperture 34 and sliding short 38. This thus provides maximum power flow to the doughmass in the conical section 12 and optimizes the uniformity of current distribution around the walls of the coaxial waveguide. The electromagnetic field thus flows through coaxial waveguide 40 towards conical section 12 and then through the inner layer 48 of non-metallic microwave transparent material of the conical section to the doughmass inside of it. With the configuration shown in FIG. 3 the microwave electromagnetic field contacts and penetrates the doughmass in the narrow part of the conical section. If so desired, means can be provided to have the microwave power penetrate the doughmass inside the cone not in its narrow part but somewhere further upstream. For example, by replacing part of the inner non-metallic cone layer, adjacent the metallic exit tube, with metal, the microwave power will not penetrate the doughmass in the narrow part of the cone but further upstream. Microwave power is absorbed by the doughmass inside the conical section in view of the relatively high loss factor or dissipation factor of the doughmass. Power is absorbed uniformly and instantaneously through to the center of the doughmass. One can employ thermocouples (not shown) embedded in the cone-end of exit pipe 42 as a means to monitor the temperature.

FIG. 4 illustrates a symbolic representation of the electric field in the waveguide and cone and there is illustrated the standing waves which are set up between aperture 34 and short 38. Thus, as shown in FIG. 5, there would be a standing wave of three half wave lengths if there were no transition cylinder. As seen in FIG. 4, the waves strike the transition cylinder 36 and then flow along the coaxial waveguide 40 as travelling waves. Three half wave lengths is a preferred number; one or two half wave lengths would not allow sufficient space between the transition cylinder 36 and moveable aperture 34 and sliding short 38 to permit adjustment while the possibility of perturbation or arcing would be increased. The arrows in the cone symbolize the penetration of microwave energy into the doughmass. There is progressively less microwave energy in the cone as the waves progress towards the wide end.

Figure 7:
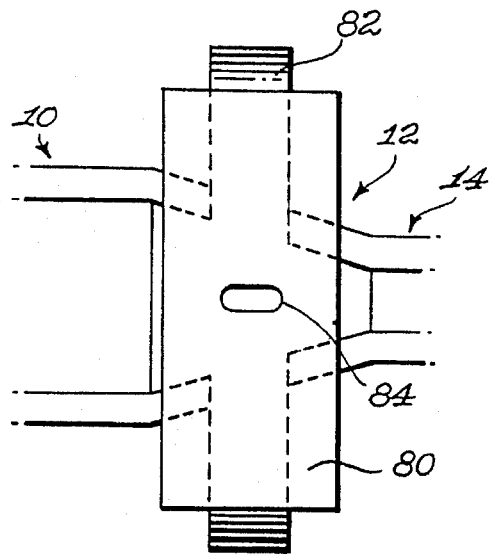
FIG. 7 is a side view thereof.
Figure 7A:
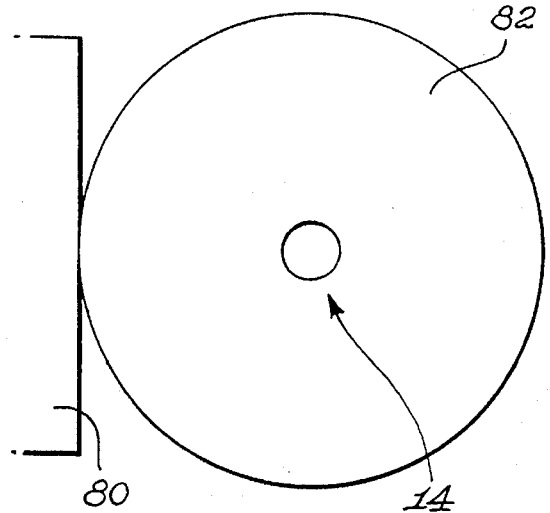
FIG. 7A is an end view thereof.

Referring to FIGS. 6, 7 and 7A, these Figures illustrate a microwave single mode cavity. As previously described, there is a feed section 10, a conical section 12, and an exit section 14. As previously discussed, at higher product flow rates, there is a greater differential of product velocity between the product at the center of the doughmass and the product adjacent the wall of the conduit. In this embodiment, there is provided a microwave single mode cavity which is a microwave resonant cavity which sets up a single microwave mode which has one or more peaks of electric field intensity.

The microwaves are propagated along a rectangular waveguide 80 in a manner similar to that previously described. However, the transition from the waveguide 80 to the circular cavity 82 is through an iris or aperture 84 which is cut into the shorting wall on the end of the waveguide. The cylindrical cavity is attached to this end wall and the same iris is cut into the round wall of the cylindrical cavity. This cavity is filled with a plastic or ceramic dielectric which supports a cone liner and provides an environment where the wavelength is somewhat shorter than in air. This shortening of the wavelength is dependant on the dielectric constant of the material which fills the cavity and which material may be selected to provide an optimum wavelength for positioning the contour of the central heating effect desired.

Figure 9:
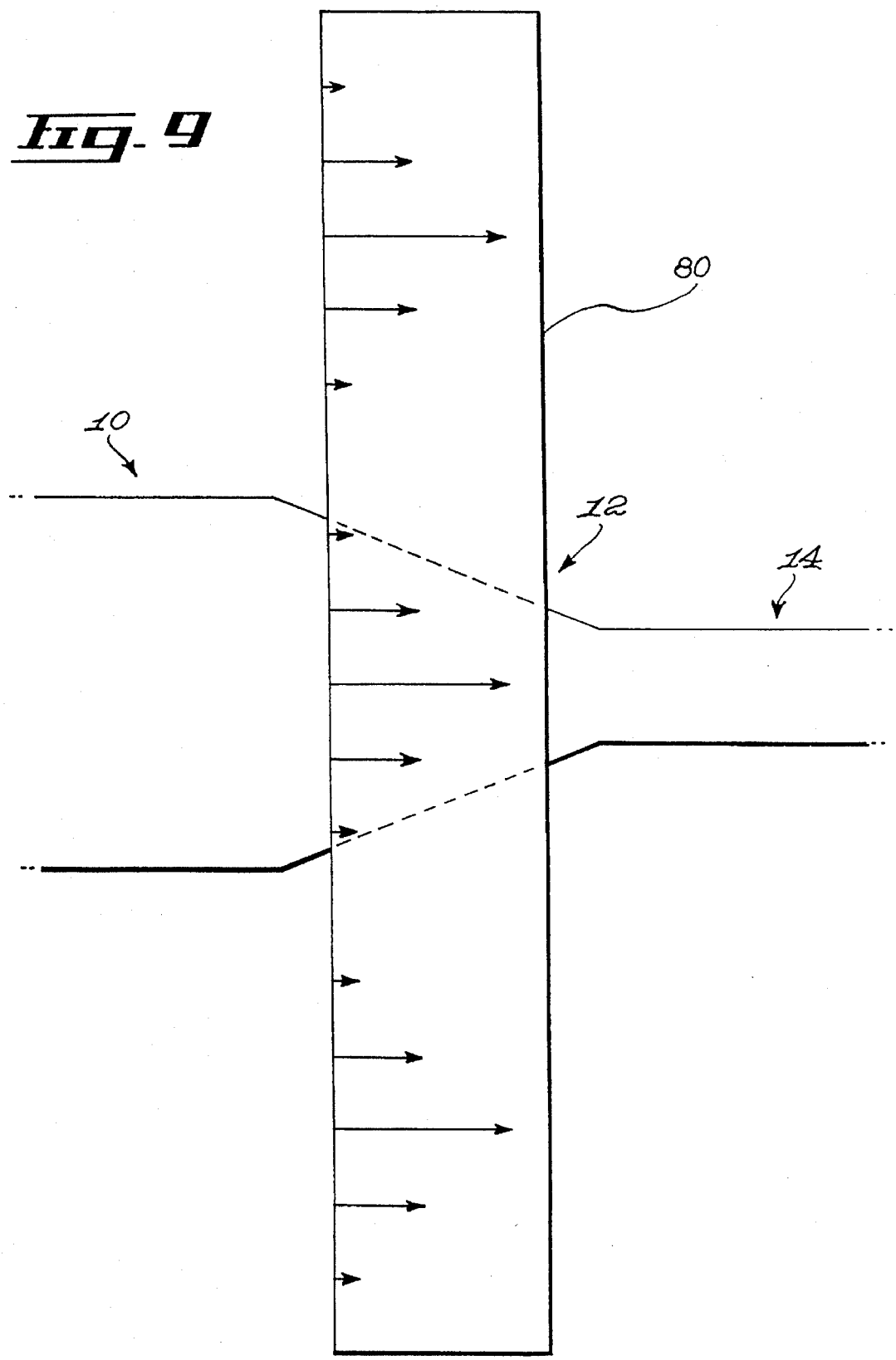
FIG. 9 is a schematic view of a microwave cone heat section having a single mode cavity showing a standing wave.

One may refer to FIG. 9 which symbolically shows the electric field intensity distribution wherein a standing wave is created with the broad peak of power density on the cone axis providing a greater central heating of the doughmass.

Figure 8:
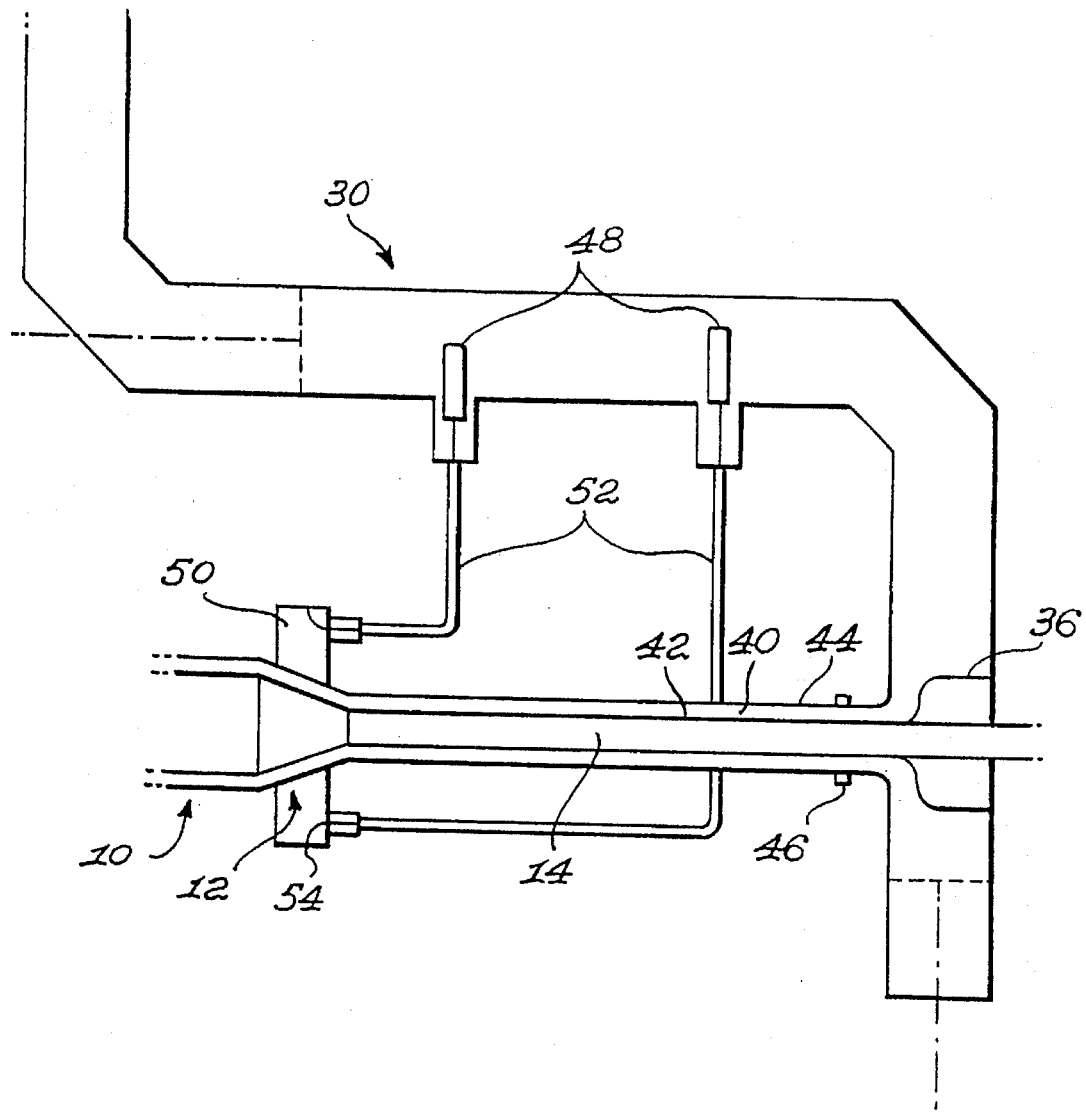
FIG. 8 is a schematic view of a microwave cone heat section having a single mode cavity with a flexible cable feed combined with a coaxial waveguide.

FIG. 8 shows a combination of two applicators; a single mode cavity applicator as described with reference to FIG. 6 and the rigid coaxial applicator with the single cone-end feed of FIG. 3. In this embodiment, the microwave power from the generator flows along rectangular waveguide 30 in which there is provided variable depth probes 48 each having a waveguide to coax transition. Power then flows along flexible coaxial cables 52 and is coupled into a single mode cavity by means of small coupling loops 54.

The insertion depth of probes 48 in rectangular waveguide 30 are variable so that power levels are the same. Suitable motorized actuators may be utilized and controlled by feedback from sensors (not shown) which are near coupling loops 54.

After contacting probes 48, microwaves continue along the rectangular waveguide in the manner described with respect to FIG. 3, strike the transition cylinder 36, then are propagated through coaxial waveguide 40 to be absorbed by the doughmass inside conical section 12.

In this way, the degree of heat contouring in the narrow part of the cone may be varied and which can be advantageous for different flow rates and/or product formulations. One could use thermocouples at the narrow end of the cone to provide a feedback control of the temperature.

FIG. 9 illustrates the principles of using standing waves. It is a symbolic representation of a cross-sectional view of the electric field intensity in a single mode cavity. In this case, three half wavelengths across a diameter are induced in the cavity with a central peak surrounded by an annular ridge of high intensity. The wave patterns are symmetrical about the center-line of the conical section. The standing waves would be analogous to the standing waves set up in the rectangular waveguide of the applicator described in the embodiment shown in FIG. 3. In this case, the standing wave would impart more power to the central part of the cone so that the edges of the product in the cone would receive less power. In other words, the slower moving dough at the cone edges would therefore heat up to a temperature similar to that achieved in the faster moving center.

The diameter of the cylindrical cavity as described would vary depending upon the non-metallic dielectric material used to fill it. Thus, if one were to use plastic material such as, for example, Lexan or Ultem, the diameter would be approximately 12 inches. A cavity made of a ceramic material with a dielectric constant higher than that of the plastic materials, would naturally have a much smaller diameter. Thus, one may optimize the apparatus depending upon the particular dielectric material used. Also, one must take into account the dielectric constant of the doughmass and the choice of frequency. For example, one could achieve a sharper peak at 2450 MHz, but in order to ensure adequate penetration to the center of the doughmass, the cavity should then be located at the narrower end of the cone.

Figure 10:
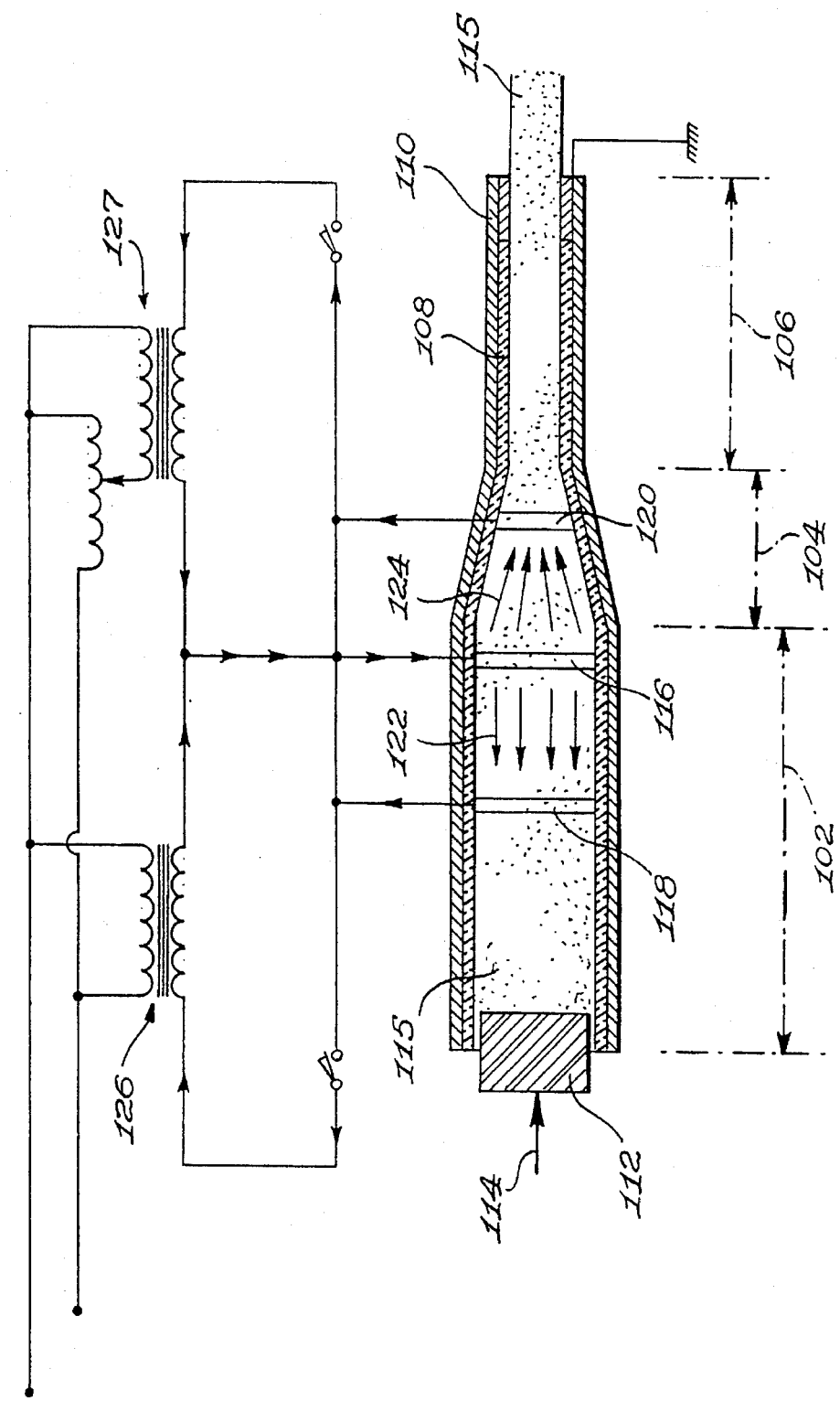
FIG. 10 is a schematic view of an embodiment of an apparatus utilizing ohmic heating.

In yet another embodiment of the invention, shown in FIG. 10, there is again provided a feed section 102, a conical section 104 and an exit section 106. For ease of illustration, there is illustrated a single structure having an inner non-conductive layer 108 and an outer reinforcing layer 110. It will be understood that distinct and separate components would normally be utilized.

A piston 112 is operated in the direction of arrow 114 to push doughmass 115 towards the exit section 106.

Mounted interiorly are three ring electrodes 116, 118 and 120 operatively connected to an electric circuit powered by two transformers 126 and 127. In this embodiment, using 60 Hertz ohmic heating, current passes from ring electrode 116 which is located in the feed section proximate the wider end of the conical section to ring electrode 118, as indicated by arrows 122, to preheat the doughmass passing therethrough. Current will also flow through the conductive doughmass 115 from ring electrode 116 to ring electrode 120, as indicated by arrows 124, to heat the doughmass, while it is going through the conical section, to a temperature above the heat coagulation temperature of the heat coaguable proteins contained therein. As a result, a fibrous texture is created and heat set and one obtains a product with a high quality texture.

Utilizing this arrangement, one could also vary the configuration of the electrodes to achieve a center heating effect similar to that discussed with respect to the embodiment utilizing microwaves.

Figure 11:
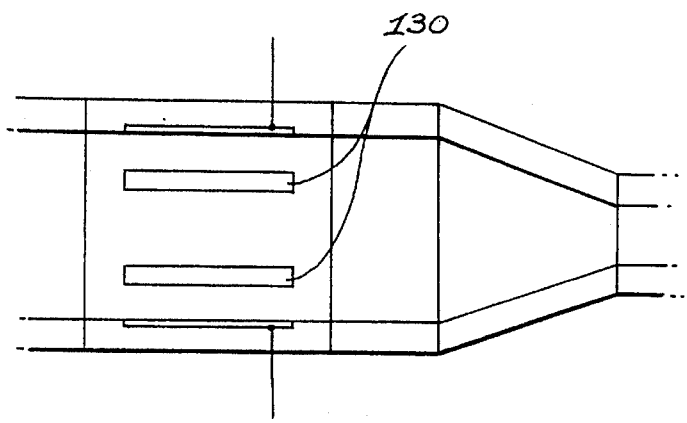
FIG. 11 is a schematic view of a slightly modified embodiment using ohmic heating.

In FIG. 11 there is illustrated a modified version of an ohmic heating apparatus. In this version, for illustration purposes, the electrodes 130 shown are those used for preheating inside the feed section; a similar principle could be used in the conical section 12.

Figure 11A:
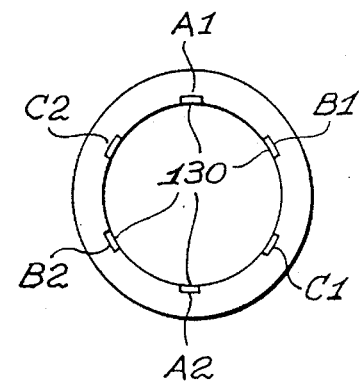
FIG. 11a is a cross-sectional view thereof.

Thus, there are provided a plurality of electrodes 130 which, in FIG. 11a, are shown as three electrode pairs (A1, A2), (B1, B2), (C1, C2).

As previously discussed, the material in the cone tends to move more slowly proximate the walls of the cone then at the center. A voltage would be applied to the electrodes arranged in pairs opposite each other on the circumference. Each electrode pair would be connected to a separate transformer through a solid state relay. When the voltage is applied to the electrodes, a current flows through the doughmass, which is conductive in view of its water and salt components. Accordingly, this would result in heating of the doughmass. The current would preferably be controlled with sequential time-sharing so that only one electrode pair is on at a given time. The current flow between the electrodes spreads across the dough. However, the current path is longer around the circumference than across the diameter so that more power is absorbed in the center. The addition of current from three electrode pairs helps produce a relatively uniform temperature gradient between the center and edge of the doughmass.

Figure 12:
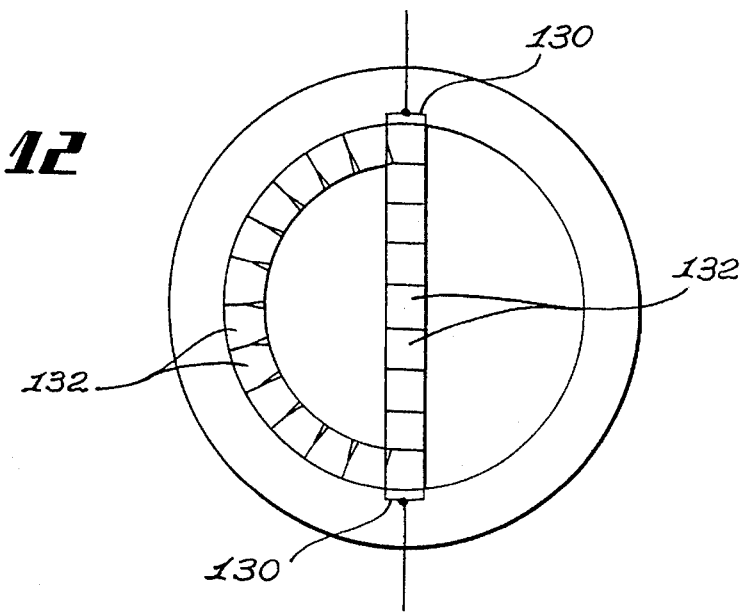
FIG. 12 is a cross-sectional view showing current flow paths for an embodiment similar to FIG. 11.

FIG. 12 illustrates current flow between the longitudinal electrodes as described in FIG. 11. Thus, if one were to consider the flow of current between two electrodes 130 and analyze its two paths with one across the diameter of the doughmass and the other path around half of the circumference. Squares 132 represent elements of unit resistance in alternative paths of current flow. Although the discussion will be limited to current flowing in the plane of the paper, the ratios of current are similar in a three-dimensional analysis. For present purposes, one will assume that the current flows in a path 0.5 inches wide and the diameter of the conduit is 4.5 inches with the path following the half circumference being 7 inches. Comparing the two paths, one may see that the resistance across the diameter would be a unit of 9 with the resistance around a circumferential path being a unit of 14. If one were to analyze the power density, one would arrive at a power ratio of 0.4:1 such that there is 2½ times more power in the path across the diameter than in the circumferential path. If one were to utilize a number of pairs of electrodes, it will be seen that there would be more heat generated in the center of the doughmass. The heating intensity follows Poisson's laws for static magnetic and electric fields and thus can be calculated.

Figure 13:
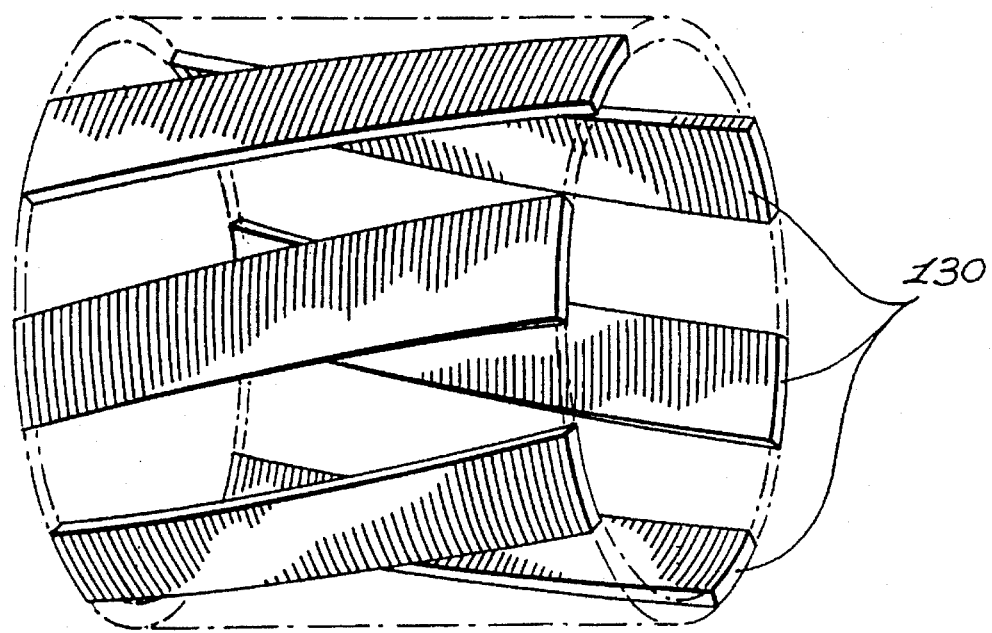
FIG. 13 is a view showing a still further embodiment of an ohmic heating apparatus.

FIG. 13 illustrates a variation of the ohmic heating embodiment, and in this Figure, it will be seen that there are a plurality of electrodes which may be installed on the inner surface of the conduit. The electrodes have a somewhat spiral configuration and utilizing this arrangement, one is able to provide a more even distribution of the heat concentration which otherwise would tend to occur near the electrodes.

It will be understood that the heating intensity on the outer diameter of the dough would be relatively high directly under the active electrodes and decrease rapidly on either side of it. When the power switches to the next pair of electrodes, this heating pattern would also move. The average heating under the electrodes would therefore become fairly uniform; however, there would be a minimum average heating intensity between adjacent electrodes.

The use of spiral or curved electrodes would function to "smear" the heating pattern to produce nearly uniform average heating intensity on the surface of the dough diameter. Because of the smearing of this heating pattern, the average heating intensity would actually be one-half of the value under the electrode.

It is preferred that the upper heating intensity level be monitored so that undesired heating effects do not occur. Particularly, it would be undesirable to have the generation of high temperature steam which tends to insulate the dough from the electrode and make the heating unstable. One means of minimizing this problem is to increase the surface area of the electrodes. Also, one could change the rate at which the switching of the electrodes is accomplished. Thus, by using solid state relays, one can apply pulses of energy before switching to another pair of electrodes. This procedure would allow any steam bubble to reach equilibrium with the temperature of the surrounding dough before additional power is induced at that point.

In one arrangement using ohmic heating, one may operate the system such that the electrodes may be considered as forming an electrode cage about the doughmass. Each electrode could be connected to either side of the line through a relay controlled by a computer and appropriate software such that only one pair of electrodes may operate at a time, but any two electrodes may form an electrode pair. Thus, the electrode cage can be operated in modes which would provide a variety of heating patterns. One could, as above mentioned, provide maximum center heating by exciting electrodes 180° apart. However, if adjacent electrodes were excited, the current flow would be confined to the outer volume of the dough cylinder. It would thus be possible to provide different heating patterns adjusted for a particular dough velocity and/or dough formulation. Furthermore, one could utilize sensors along with suitable control software to vary the heating pattern as required.

Still further, it is possible to combine various of the methods described herein. One could, for example, provide ohmic heating in a certain region where required such as at the exit end of the conical section. A plastic cone section would still be compatible with a single mode cavity microwave applicator.

It will be understood that the above described embodiments are for purposes of illustration only and that changes and modifications may be made thereto without departing from the spirit and scope of the invention.

What is claimed is:

1. A method of producing a food product having fibers formed therein, the method comprising the steps of
   a) forming a doughmass,
   b) passing said doughmass through a conduit having a decreasing cross-sectional area in the direction of doughmass flow,
   c) subjecting said doughmass to a thermal treatment while in said conduit such that a greater heat intensity is applied to the interior portion of the doughmass compared to the doughmass adjacent the conduit walls,
   d) thereafter passing said doughmass through an exit pipe having a substantially constant cross-sectional area.

2. The method of claim 1 wherein said step of subjecting said doughmass to a thermal treatment comprises the step of using microwaves to heat said doughmass, said microwaves being such that a standing wave is created to apply the greater heat intensity to the interior portion of the doughmass compared to the doughmass adjacent the conduit walls.

3. The method of claim 1 wherein said step of subjecting the doughmass to a thermal treatment comprises the step of passing current through said doughmass to thereby heat the doughmass by ohmic heating.

4. The method of claim 1 wherein said step of subjecting said doughmass to a thermal treatment includes the step of cooling the doughmass adjacent the conduit walls.

5. The method of claim 1 further including the step of constantly measuring the temperature of said doughmass throughout said conduit having said decreasing cross-sectional area and adjusting heat input to said doughmass as a result of said measurements.

6. A method of producing a food product having fibers formed therein, the method comprising the steps of:
   a) forming a doughmass,
   b) passing said doughmass through a conduit having a decreasing cross-sectional area in the direction of doughmass flow,
   c) subsequently passing said doughmass through an exit pipe having a substantially constant cross-sectional area; and
   d) heating said doughmass while in said decreasing cross-sectional area conduit by guiding microwaves through a coaxial wave guide formed between an exterior of said exit pipe and a housing thereabout such that said microwave energy passes through a wall of said conduit in order to heat the doughmass product therein.

7. The method of claim 6 further includes the step of preheating said doughmass prior to entering said conduit.

8. A method of producing a food product having fibers formed therein, the method comprising the steps of forming a doughmass, passing said doughmass through a conduit having a decreasing cross-sectional area in the direction of doughmass flow, passing an electric current through said doughmass to thereby heat said doughmass by ohmic heating, and thereafter passing said heated doughmass through an exit pipe having a substantially constant cross-sectional area.

9. The method of claim 8 wherein the step of ohmic heating of said doughmass while in said conduit comprises the step of applying a greater heat intensity to the interior portion of the doughmass compared to the heat intensity applied to the doughmass adjacent the conduit walls.

10. The method of claim 8 wherein the step of ohmic heating said doughmass while in said conduit comprises the step of supplying first and second spaced apart ring electrodes at the periphery of said conduit and applying a voltage to said ring electrodes to cause current flow through said doughmass.

11. The method of claim 8 wherein the step of ohmic heating said doughmass while in said conduit comprises the step of supplying a plurality of electrodes spaced about the periphery of said conduit and applying a voltage to a pair of said electrodes to cause a current flow between the electrodes through the doughmass in a direction substantially transverse to the direction of doughmass flow.

12. The method of claim 11 wherein the step of supplying a plurality of electrodes spaced about the periphery of said conduit comprises the step of providing a plurality of diametrically opposed electrode pairs and selectively applying a voltage to said electrode pairs to cause a current flow between electrode pairs through the doughmass.

13. The method of claim 12 further including the step of sensing a property of said doughmass and selectively applying voltage to one or more of said pairs of electrodes to effect a desired current flow and resultant heating pattern in said doughmass.

14. The method of claim 12 further including the step of cooling said doughmass adjacent the walls of said conduit.

15. The method of claim 8 further including the step of pre-heating said doughmass prior to said doughmass passing through said conduit.

16. A method of heating a food product passing through a conduit, said method comprising the steps of passing the food product through an elongated conduit in a first direction having a plurality of electrodes on a wall thereof, and selectively applying a voltage between a pair of said electrodes to cause electric current to flow between said pair of electrodes in a direction substantially transverse to said first direction and thereby ohmically heat said food product.

17. The method of claim 16 including the step of measuring the temperature of said food product at a plurality of locations and selectively applying a voltage to one or more pairs of electrodes to provide a desired temperature profile.

18. The method of claim 16 wherein said voltage is sequentially applied to differing pairs of electrodes to provide a more uniform temperature profile.

19. The method of claim 16 wherein the step of passing the food product through a conduit comprises the step of passing the food product through a conduit having a plurality of curvilinearly and longitudinally extending parallel electrodes on a wall thereof.

* * * * *